US008990011B2

(12) United States Patent
Zhao et al.

(10) Patent No.: US 8,990,011 B2
(45) Date of Patent: Mar. 24, 2015

(54) DETERMINING USER DEVICE'S STARTING LOCATION

(71) Applicant: Microsoft Corporation, Redmond, WA (US)

(72) Inventors: Chunshui Zhao, Beijing (CN); Fan Li, Beijing (CN); Jun Zhao, Beijing (CN); Huan Ding, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 13/781,448

(22) Filed: Feb. 28, 2013

(65) Prior Publication Data

US 2014/0244163 A1 Aug. 28, 2014

(51) Int. Cl.
*G01C 21/00* (2006.01)
*G01C 21/16* (2006.01)
*G01C 21/20* (2006.01)
*G01S 5/02* (2010.01)
*H04W 64/00* (2009.01)

(52) U.S. Cl.
CPC ............. *G01C 21/00* (2013.01); *G01C 21/165* (2013.01); *G01C 21/206* (2013.01); *G01S 5/02* (2013.01); *H04W 64/00* (2013.01)
USPC ............................ 701/445; 701/446; 701/447

(58) Field of Classification Search
USPC .................................................. 701/445–447
See application file for complete search history.

(56) References Cited

U.S. PATENT DOCUMENTS

| 7,640,134 | B2 | 12/2009 | Park et al. |
| 7,690,556 | B1 | 4/2010 | Kahn et al. |
| 8,180,591 | B2 | 5/2012 | Yuen et al. |
| 8,355,870 | B2* | 1/2013 | Link et al. ...................... 701/533 |
| 8,615,377 | B1 | 12/2013 | Yuen et al. |
| 2004/0181335 | A1* | 9/2004 | Kim et al. ...................... 701/207 |
| 2007/0010939 | A1* | 1/2007 | Kreutz et al. .................. 701/207 |
| 2008/0077326 | A1 | 3/2008 | Funk et al. |
| 2008/0120062 | A1 | 5/2008 | Lee et al. |
| 2008/0306689 | A1 | 12/2008 | Kourogi et al. |

(Continued)

FOREIGN PATENT DOCUMENTS

WO WO0239063 5/2002

OTHER PUBLICATIONS

Ei-Sheimy et al., "Everywhere Navigation," Proceedings: Inside GNSS, Sep./Oct. 2011, retrieved at <<www.insidegnss.com/auto/sepoct11-El%20Sheimy.pdf>>, pp. 74-82.

(Continued)

*Primary Examiner* — Hussein A. Elchanti
(74) *Attorney, Agent, or Firm* — Dan Choi; Judy Yee; Micky Minhas

(57) ABSTRACT

A user device is equipped with one or more sensors that collect data relating to a movement of a user having the user device. An estimated area within which a starting location of the user device is located is determined based on one or more signals received from adjacent signal sources. A plurality of candidate locations is identified within the estimated area as the potential starting location of the user device. Map information of surrounding area that covers the estimated area is also obtained. One or more candidate locations are filtered out depending on whether they could have experienced the movement based on the map information. When one or more re-starting conditions have met during the movement, a then starting location of the user device needs to be determined.

20 Claims, 8 Drawing Sheets

(56) References Cited

U.S. PATENT DOCUMENTS

| | | | |
|---|---|---|---|
| 2009/0043504 | A1 | 2/2009 | Bandyopadhyay et al. |
| 2009/0192708 | A1 | 7/2009 | Yoo et al. |
| 2010/0004860 | A1 | 1/2010 | Chernoguz et al. |
| 2010/0130229 | A1 | 5/2010 | Sridhara et al. |
| 2012/0109517 | A1* | 5/2012 | Watanabe ............... 701/431 |
| 2012/0290254 | A1 | 11/2012 | Thrun et al. |
| 2013/0120187 | A1* | 5/2013 | Dai et al. ............ 342/357.27 |

OTHER PUBLICATIONS

Cho et al., "AutoGait: A Mobile Platform that Accurately Estimates the Distance Walked," IEEE International Conference on Pervasive Computing and Communications (PerCom), Mar. 29, 2010-Apr. 2, 2010, 9 pages.

Fang et al., "Design of a Wireless Assisted Pedestrian Dead Reckoning System—The Navmote Experience," Proceedings of IEEE Transactions on Instrumentation and Measurement, Dec. 6, 2005, retrieved at <<http://ieeexplore.ieee.org/stamp/stamp.jsp?tp=&arnumber=1542534>>, 17 pages.

Kim et al., "A Step, Stride and Heading Determination for the Pedestrian Navigation System," Proceedings: Journal of Global Positioning Systems, Nov. 15, 2004.

Office action for U.S. Appl. No. 13/240,743, mailed on Jan. 16, 2014, Li, et al., "Step Detection and Step Length Estimation", 13 pages.

PCT Search Report and Written Opinion for Application No. PCT/US2014/019516, mailed on Jun. 18, 2014, 12 pages.

Shin et al., "Adaptive Step Length Estimation Algorithm Using Low-Cost MEMS Inertial Sensors," Proceedings: SAS '07. IEEE Sensors Applications Symposium, Feb. 6-8, 2007, pp. 1-5.

Wang et al., "A Novel Pedestrian Dead Reckoning Algorithm Using Wearable EMG Sensors to Measure Walking Strides," Proceedings of Ubiquitous Positioning Indoor Navigation and Location Based Service (UPINLBS), 2010, pp. 1-8.

Widyawan et al., "A Novel Backtracking Particle Filter for Pattern Matching Indoor Localization", In the Proceedings of the 1st ACM International Workshop on Mobile Entity Localization and Tracking in GPS-less Environments, Sep. 19, 2008, pp. 79-83.

* cited by examiner

DETERMINING USER DEVICE'S STARTING LOCATION

BACKGROUND

Parallel to a global position system (GPS) for vehicle navigation, a pedestrian navigation system (PNS) provides navigation instructions to a user for navigating around an area, such as an office building or a shopping mall. Determining a starting location of the user is important for the PNS to provide accurate and prompt navigation instructions.

The current techniques for determining the starting location of the user involve identifying WiFi® signals received by a user device such as a mobile device. However, these methods alone do not provide enough accuracy to be useful for pedestrian navigation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A user device may be equipped with one or more sensors to collect moving data of the user device carried by the user during a movement. The sensors may include one or more motion sensors, such as accelerometer, gyroscope, compass, and one or more signal sensors that collect one or more signals, such as WiFi® signals, from one or more adjacent signal sources. The moving data may include any data related to the movement such as data related a direction, a distance, and/or or a moving track of the user device during the movement. The signals received by the signal sensors may also be used to help determine the movement. A computing system to determine a starting location of the user device may reside at the user device, a remote server connected with the user device through a network, or a combination thereof. The computing system may use the collected signals to calculate an estimated area in which a starting location of the user device is located at the first time, and may identify a plurality of candidate locations within the estimated area as potential starting locations.

The computing system may also receive or pre-install map information at the user device. After the estimated area in which the starting location of the user device is located, map information of a surrounding area of the user device that includes at least the estimated area is either identified from the pre-installed map information or received from a map source such as a server. For example, the surrounding area may be a shopping mall or an office building. One or more impossible locations may include one or more locations that are impossible for the user or the user device to stay, such as walls or fixtures, may be derived from the map information. The computing system also may use the collected moving data to calculate the movement of the user device including its direction and moving distance within a period. The one or more impossible locations may also include one or more locations that a moving pattern between an estimated starting location and such one or more locations are impossible for a human.

The computing system then filters out one or more candidate locations based on whether such candidate locations could have experienced the movement based on the map information. If a respective candidate location, after experiencing the movement, ends at or crosses an impossible location, such respective candidate location is filtered out. If all but one remaining candidate locations have been filtered out before a threshold, the computing system may determine the remaining candidate location to be the starting location of the user device at the first time.

The computing system may also re-initialize determining the starting location of the user device at a second time when at least one preset re-initialization condition has been met. Such re-initialization conditions may include but are not limited to all candidate locations being filtered out before the threshold and the distance between the determined starting location of the user device at the first time and a current location of the user device being longer than a threshold of distance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

The present disclosure describes example techniques to determine a starting location of the user device and thereby to provide accurate navigation instructions to the user. The techniques may be used in, for example, a pedestrian navigation system (PNS). The term "techniques," for instance, may refer to device(s), system(s), method(s) and/or computer-readable instructions as permitted by the context above and throughout the present disclosure. The techniques described herein provide a user device equipped with one or more signal sensors to receive signals from and/or transmit signals to adjacent signal sources, and one or more motion sensors to collect sensor data relating to a movement of the user. Map information of a surrounding area of the user may be obtained from a database or pre-installed at memory of the user device. The user device may act singly or together with a server to determine the starting location of the user at least partly based on the received signals, the sensor data, and the map information.

In one example embodiment, the received signals are used to determine an estimated starting location of the user device at a first time. An estimated area, within which a starting location of the user device is located at the first time, is determined based on the estimated starting location. A plurality of candidate locations is identified within the estimated area. Each candidate location represents a potential starting location of the user device at the first time. One or more candidate locations are filtered out based on whether the candidate locations could have experienced the movement from the one or more candidate locations. For example, if an ending location of a respective candidate location after experiencing the movement is at an impossible location for the user device to stay, such as walls, trees, or any fixtures, or an impossible location for a moving pattern of the user device, such respective candidate location is filtered out. Once all but one remaining candidate location have been filtered out, such remaining candidate location is deemed as the starting location of the user device at the first time.

The present disclosure also describes re-initializing determination of a then current location of the user device as a starting location of the user device at a second time when at least one re-initialization condition has been met. For example, when all candidate locations are filtered out, there is a need to re-determine the then current location of the user device. For another example, if a distance between the estimated starting location at the first time and an ending location of a respective unfiltered candidate location during the movement is more than a preset threshold, the techniques may also re-determine the then current location of the user device to provide accurate navigation instructions.

Figure 1:
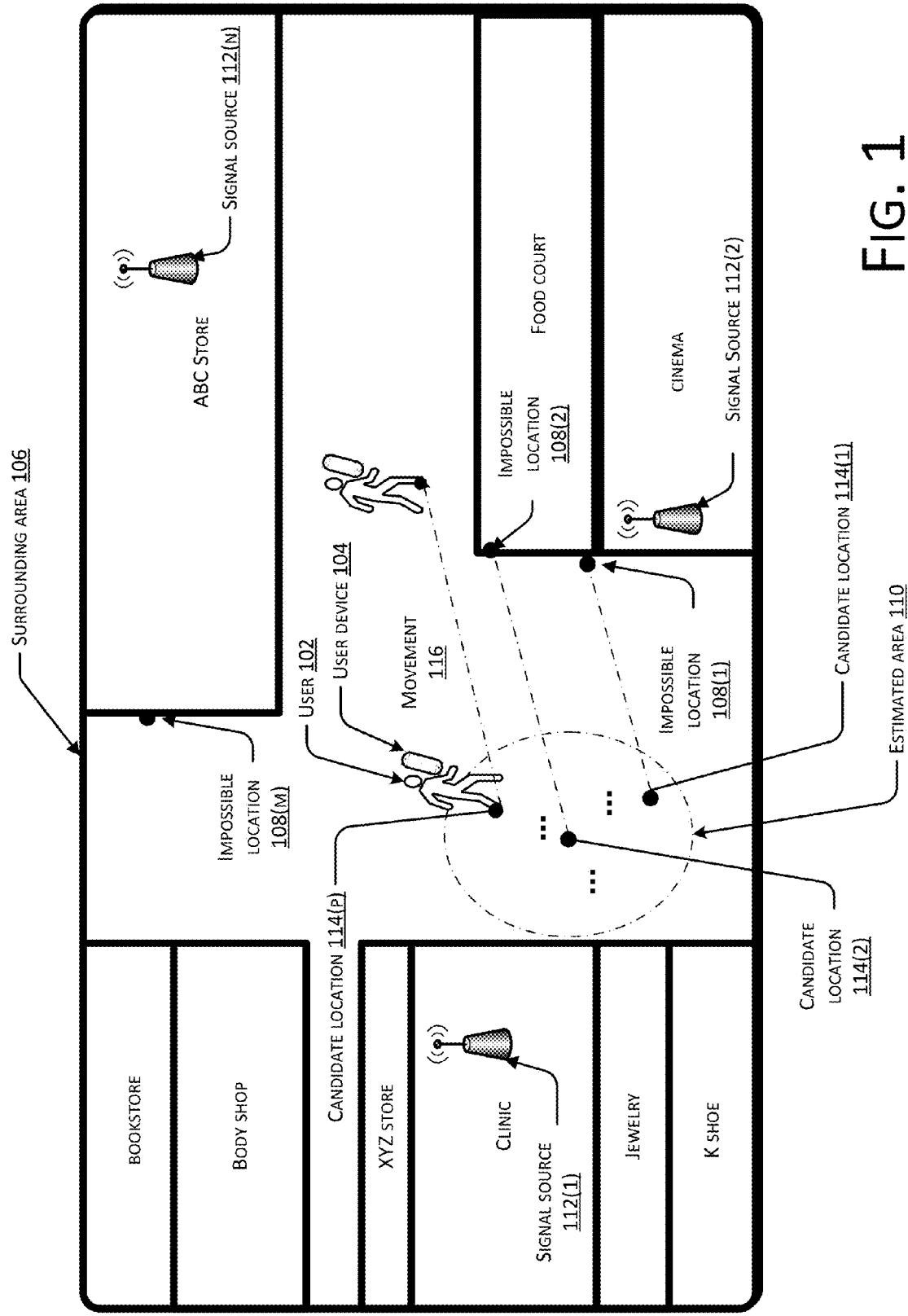
FIG. 1 illustrates an example scenario for determining a starting location of a user device at a first time.

FIG. 1 illustrates an example scenario of determining a starting location of a user device. In the example of FIG. 1, a user 102 may carry a user device 104 and move within a surrounding area 106.

The user device 104 may include all or part of a computing system for determining the starting location of the user device 104 and step detection and step length estimation. Unless contradicted with the description herein, details of the step detection and step length estimation are described in U.S. patent application Ser. No. 13/240,743, Li, et al. "Step Detection and Step Length Estimation."

The user 102 may or may not be in direct physical contact with the user device 104. By way of example and not limitation, the user 102 may, for example, hold the user device 104 in his/her hand, fasten the user device 104 to his/her body such as a hand, arm, leg or waist, carry the user device 104 in a bag, or put the user device 104 in a pocket of the user 102. The surrounding area 106 is any area that surrounds the user 102, which may be, for example, a shopping mall, an office building, a plaza, etc. In the example of FIG. 1, the surrounding area 106 is a shopping mall that includes various stores such as a bookstore, a body shop, an XYZ store, a clinic, a jewelry, a K store, a cinema, a food court, and an ABC store, and also hallways and open spaces between the stores. The surrounding area 106 may change along with a movement of the user 102.

The user device 104 may receive map information of a portion or all surrounding area 106 from a server or may pre-installed such map information at its memory. The user device 104 may present the map information at a display of the user device 104. Such map information may change along with the movement of the user 102 or by instruction from the user 102 to show different portions of the surrounding area 106. The map information may include information of fixtures, buildings, and hallways and open spaces in the surrounding area 106. The map information may also include one or more points of interest such as shops, stores, cinemas, hospitals, trees, and hallways and open spaces in the surrounding area 106 as shown in FIG. 1.

The map information of the surrounding area 106 may include one or more impossible locations 108(1) ... (m), where m is a number of the impossible locations. The impossible locations 108 are locations that are impossible for the user 102 or the user device 104 to stay. For example, the impossible locations 108 may include a wall, a tree, or a fixture that has no space for the user 102 or the user device 104 to stay according to the map information. In contrast, a place not occupied by the fixture, such as a hallway and an open space in the building, a walking path in the store may be not identified as an impossible location 108.

In one example, the impossible locations 108 may be known by the computing system in advance. In another example, the computing system may calculate such impossible locations 108 based on the map information and include them in the map information before using it. Alternatively, the computing system may determine in real-time whether one or more positions are impossible locations 108 based on the map information of the surrounding area 106.

The computing system may determine an estimated area 110 within which the starting location of the user device 104 is located. After the estimated area in which the starting location of the user device 104 is located, map information of the surrounding area 106 of the user device 104 that includes at least the estimated area 110 is either identified from the pre-installed map information or received from a map source such as a server.

For example, the user device 104 may be equipped with one or more signal sensors to send and/or receive signals from adjacent one or more signal sources 112(1) ... 112(n), where n can be any integer, to determine the estimated area 110. For instance, the one or more signal sources 112 may be one or more access points that send WiFi® signals. The user device 104 may be equipped with one or more WiFi® network interface cards to receive the WiFi® signals. The computing system calculates the estimated area 110 based on the received signals and their strength from one or more adjacent signal sources 112. In the example of FIG. 1, the computing system may use, in part, the signals sent from the adjacent signal sources 112(1) and 112(2) to determine the estimated area 110.

After determining the estimated area 110, the computing system selects or identifies a plurality of candidate locations 114(1) ... 114(p) within the estimated area 110, where p is a number of the candidate locations. The number of the candidate locations may be preset or calculated based on one or more factors including a configuration of the user device 104 such as a model of the user device 104 or a computing capability of the user device 104. For example, p may be preset as 1,000 if the user device 104 is a cell phone or p may be preset as 10,000 if the user device 104 is a tablet or slate that usually has advanced computing capability than the cell phone. Each of the plurality of candidate locations 114(1) ... 114(p) acts as a potential starting location of the user device 104.

As the user 102 moves (e.g., walks, runs or jogs, moves up or down, etc.) in the surrounding area 106, the computing system calculates or detects a movement 116 of the user device 104 by using moving data collected by one or more sensors of the user device 104. The one or more sensors may include, but are not limited to, an accelerometer, a pedometer, a digital compass, a gyroscope, the signal sensor, etc. The calculated or detected movement 116 may show a moving track of the user device 104, such as a moving direction, a moving distance.

The computing system then filters out one or more of the candidate locations 114 as potential starting locations based on the movement 116 and the map information. For example, based on the map information and the detected movement 116, the computing system determines whether the user device 104 could have experienced the movement 116 at each of the plurality of candidate locations 114(1) . . . (n). If it is determined that the user device 104 could not have experienced the movement from a respective candidate location, such candidate location is filtered out as a potential starting location.

For example, the candidate locations 114(1) and 114(2), if moving along the direction and distance of the movement 116 would end at or cross one of the impossible locations 108(1) and 108(2) respectively. Thus, the user device 104 could not experience the movement 116 from the candidate locations 114(1) and 114(2). The candidate locations 114(1) and 114(2) are filtered out as potential starting locations of the user device 104.

In contrast, the candidate location 114(p) after experiencing the movement 116 does not end at or cross any of the impossible locations, thus the candidate location 114(p) remains as a potential starting location.

After filtering, once there is only one candidate location such as the candidate location 114(p) that has not been filtered out before a threshold such as a threshold of time or a threshold of distance is met during the movement 116, the candidate location 114(p) is determined to be the starting location of the user device 104.

The computing system may also determine whether one or more re-initialization conditions have been met such that a starting location of the user device 104 needs to be re-initialized, which will be described in detail below.

Figure 2:
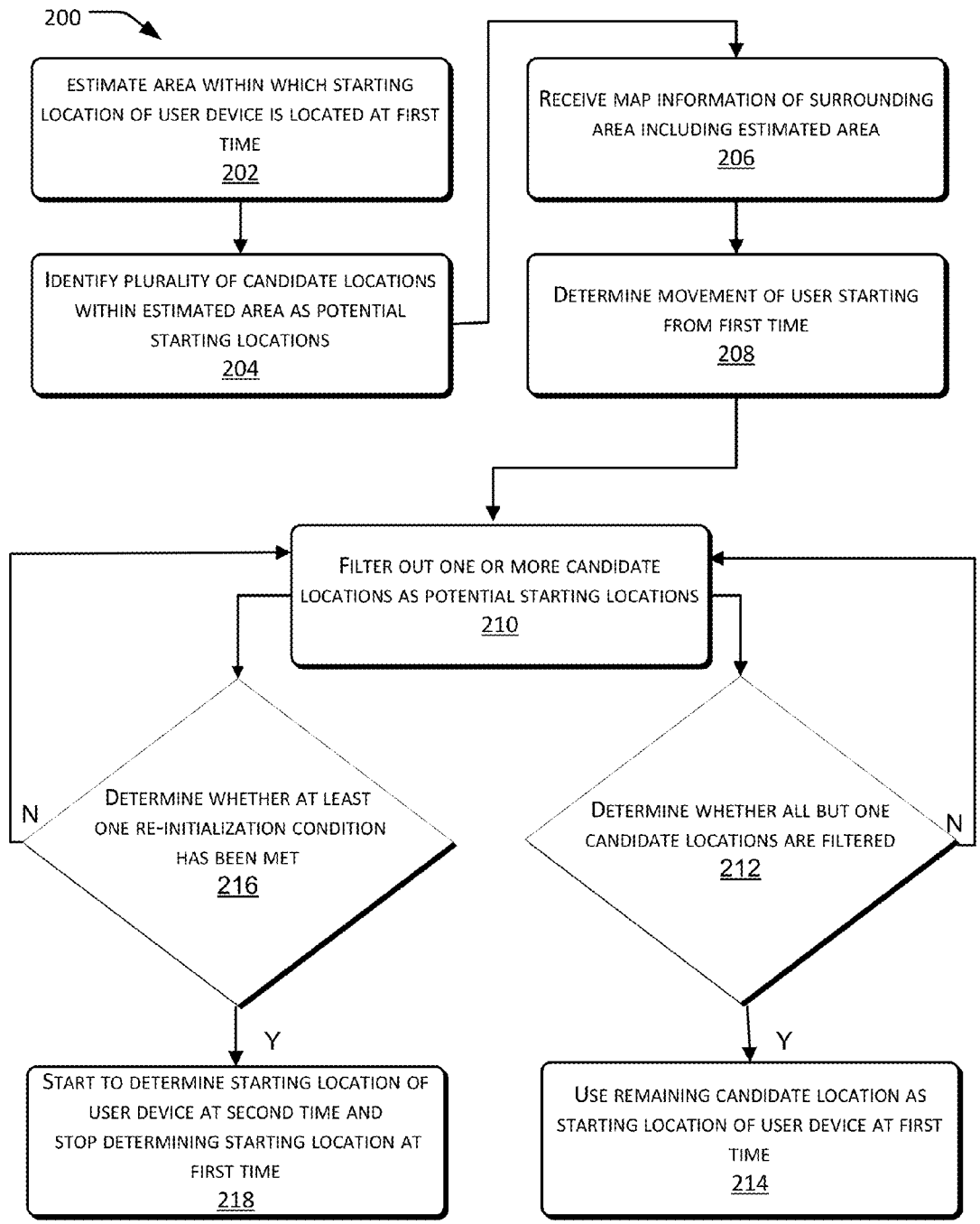
FIG. 2 is a flowchart illustrating an example method for determining the starting location of the user device at the first time.

FIG. 2 illustrates a flowchart of an example method for determining the starting location of the user device 104. At 202, the computing system calculates the estimated area 110 within which the starting location of the user device 104 is located at a first time. At 204, the computing system identifies the plurality of candidate locations 114 within the estimated are 110 as potential starting locations. For example, the computing system may randomly and/or uniformly identify multiple locations as the plurality of candidate locations 114.

At 206, the computing system receives map information of the surrounding area 106 including at least the estimated area 110 from a map source. The map source may be a server that provides the map information to the user device 104, a database already stored in the memory of the user device 104 that includes the map information, or a combination of map information stored at the user device 104 and the server. For example, before determining whether the plurality of candidate locations 114 could have experienced the movement 116, the computing system may start to filter out the plurality of candidate locations 114 if any of them are at one of the impossible locations 108 for the user device to stay. In one example, the computing system may identify another one or more candidate locations 114 within the estimated area 110 if some candidate locations are filtered out, the number of identified another one or more candidate location may be equivalent to the filtered candidate locations. In another example, the computing system may not identify another one or more candidate locations 114 if some candidate locations are filtered out.

At 208, the computing system determines the movement 116 of the user device 104 starting from the first time based on data collected by one or more sensors of the user device 104. For example, the movement 116 may be represented as a vector that has direction and length but is not sufficient to determine the starting location by itself. That is why the moving track of the candidate locations 114, represented by dash lines, are parallel as they have same moving direction.

At 210, the computing system filters out one or more candidate locations 112 as potential starting locations if such candidate locations 112 could not have experienced the movement 116. At 212, the computing system determines whether all but one remaining candidate locations are filtered. If a result is negative, (i.e., there are still more than two candidate locations qualified as the potential starting location) the computing system would continue to filter out the candidate locations at 210. If the result is positive, (i.e., there is only one candidate location remaining) at 214 the computing system then use the remaining candidate location as the starting location of the user device 104 at the first time.

At 216, the computing system determines whether at least one initialization condition has been met. For example, one reinitialization condition may be whether the computing system has determined the starting location of the user device 104 at the first time before a threshold, which may be a threshold of time or a threshold of distance that the user 102 moves. If the computing system cannot filter out all but one candidate locations before the threshold is met, it will be deemed that one re-initialization condition has been met. Some other example re-initialization conditions will be described in detail below.

If a result at 216 is negative, the computing system would continue to filter out the candidate locations 114 at 210. If the result at 216 is positive, at 218, the computing system stops determining the starting location of the user device 104 at the first time start, records a second time when the computing system determines at least one re-initialization condition has been met, and starts to determine a starting location of the user device 104 at the second time.

In the example of FIG. 2, the computing system may make parallel determinations at 212 and 216. In other examples, the computing system may make decisions in a sequential order. For example, the computing system may make a determination at 212 first and then make a determination at 216, and the corresponding workflow may also be changed, which are not detailed herein.

Figure 3:
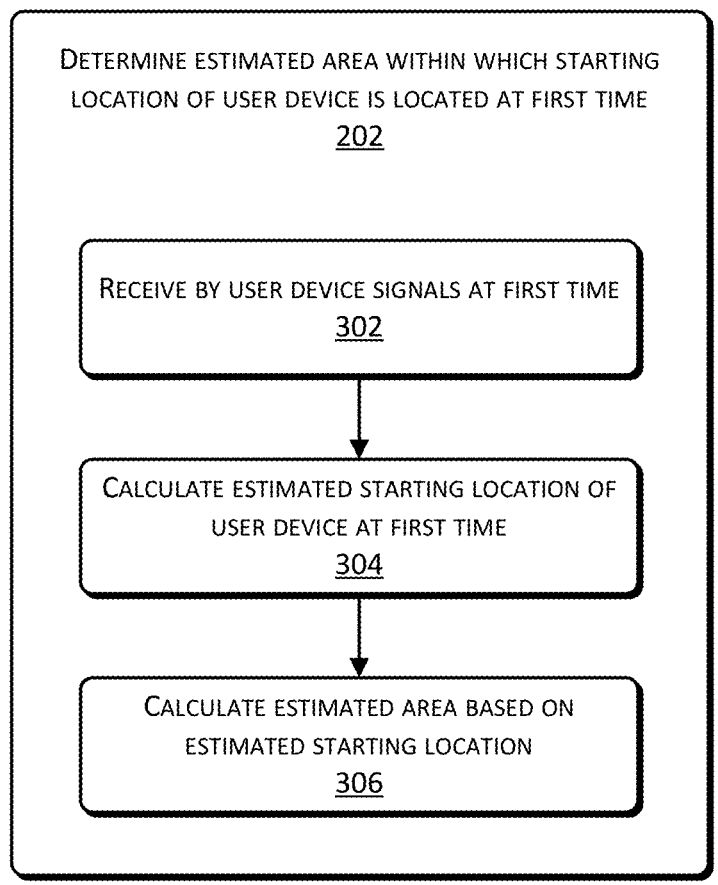
FIG. 3 is a flowchart illustrating an example method for determining an estimated area within which the starting location of the user device is located.

By reference to operations at 202 in FIG. 2, FIG. 3 illustrates a flowchart of an example method for determining the estimated area 110 within which the starting location of the user device 104 is located at the first time.

At 302, the signal sensors of the user device 104 receive signals from one or more adjacent signal sources 112 at the first time. For example, the signal sensors of the user device 104 may send/or receive signals through a near field communication channel. Examples of the near field communication channel include, but are not limited to, infrared communication, radio-frequency (RF), Bluetooth®, WiFi®, ZigBee®, infrared data association (IrDA), high-frequency modulated visible light and/or modulated audio. In the example of FIG. 1, the one or more signal sources 112 are access points that transmit WiFi® signals. The one or more signal sensors of the user device 104 may receive the WiFi® signals from the signal sources 112.

At 304, the computing system calculates an estimated starting location of the user device 104 based on the received one or more signals at the first time, which will be described in detail below. At 306, the computing system calculates the estimated area 110 based on the estimated starting location. For example, the estimated starting location may be regarded as a central point of the estimated area 110. Based on a preset size of the estimated area 110, the computing system may calculate the estimated area based on the estimated starting location. For example, the computing system may set the size of the estimated area 110 based on the accuracy of the signal location techniques. For instance, if the signal is WiFi®, the computing system may use 10 meters as a preset radius to determine the estimated area 110 based on the estimated starting location.

Figure 4:
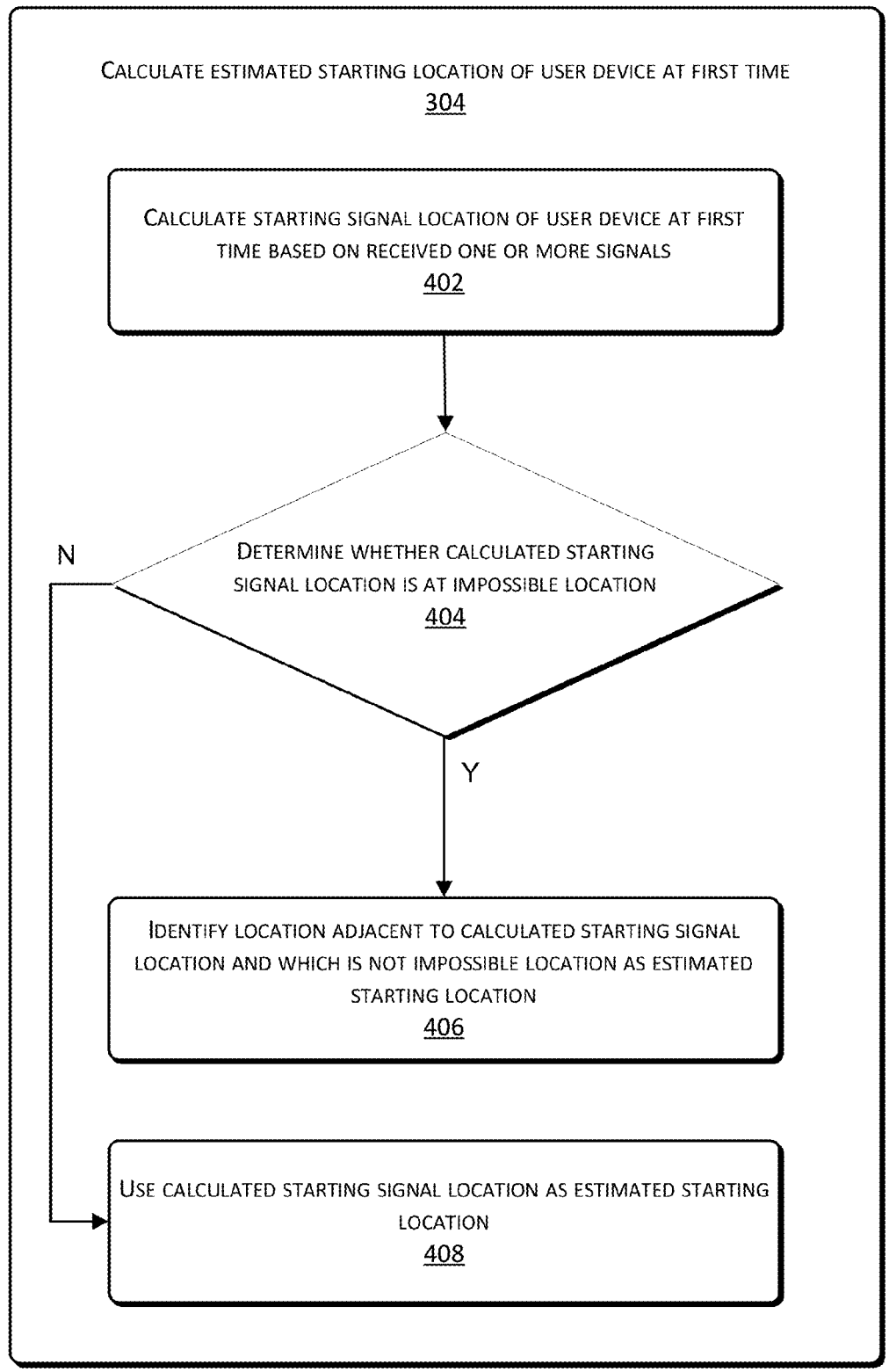
FIG. 4 is a flowchart illustrating an example method for calculating an estimated starting location of the user device.

By reference to operations at 304 in FIG. 3, FIG. 4 illustrates a flowchart of an example method for calculating the estimated starting location of the user device 104 at the first time.

At 402, the computing system calculates a starting signal location of the user device 104 at the first time based on the one or more signals sent or received by the one or more signal sensors of the user device 104 from the adjacent one or more signal sources 112. For example, the computing system may use one of following two methods to calculate the starting signal location of the user device.

A first example method is called the "fingerprint" method. The computing system measures the signals of different signal sources 112, such as access points (APs) at different places of the surrounding area 106 and constructs a map of the AP signals at the surrounding area 106. The starting signal location of the user device 104 may be determined by comparing the received and sampled signals with the map of the AP signals. If there is a match, the corresponding location at the map of the AP signals is determined as the starting signal location of the user device 104. This method may require a relatively high number of signal sources to make an accurate match, and may be time and labor intensive.

A second example method is called the "radio propagation model" method. The computing system may predict the propagation of signals from one or more signal sources 112 based on multiple parameters such as frequency, distance and/or other conditions. The computing system may measure the signal strength of the received signals and may calculate the starting signal location of the user device 104 based on the measured signal strengths. However, the accuracy of the starting location may be limited. For example, conventional WiFi® localization techniques may only provide accuracy to within 10 meters with 80~90% possibility. In addition, conventional WiFi® localization techniques may take almost 1 second to scan the nearby APs and another 1 or more seconds to calculate the location resulting in undesirable latency. Given this time latency, the calculated starting signal location under the conventional WiFi® localization technique may be different from the user's real starting location especially when the user is moving during the time.

In order to obtain a more accurate starting signal location, the computing system may, in one example, calculate multiple signal locations of the user device 104. Each signal location of the user device 104 refers to a calculated location of the user device 104 based on signals received from a particular adjacent signal source. The computing system may use an average value of the multiple signal locations as a calculated starting signal location of the user device 104. The calculated starting signal location of the user device 104 is an estimate of the starting location of the user device based on the received signals from adjacent one or more signal sources.

In the example of FIG. 1, the candidate location 114(2) may be the calculated starting signal location based on the average signal locations arising from calculation based on signals from the signal sources 112(1) and 112(2) respectively. The calculated starting signal location is also identified as one of the candidate locations 114.

At 404, the computing system determines whether the calculated starting signal location of the user device 104 is at one of the impossible locations 116 for the user device 104 to stay. As the calculated starting signal location is based on the signals, it is possible that such calculated starting signal location may locate at one of the impossible locations 116.

At 406, if it is determined that the calculated starting locations is at the impossible location, the computing system may identify a location that is not the impossible location and adjacent to the calculated signal location as the estimated starting location. For example, the computing system may randomly select a location, not at an impossible location, whose distance to the calculated starting location is shorter than a threshold of distance as the estimated starting location of the user device 104 at the first time. For instance, the computing system may select an adjacent location on a nearest hallway or open space as the estimated starting location at the first time.

At 408, if it is determined that the calculated starting locations is not at the impossible location, the computing system may use the calculated starting signal location as the estimated starting location.

Figure 5:
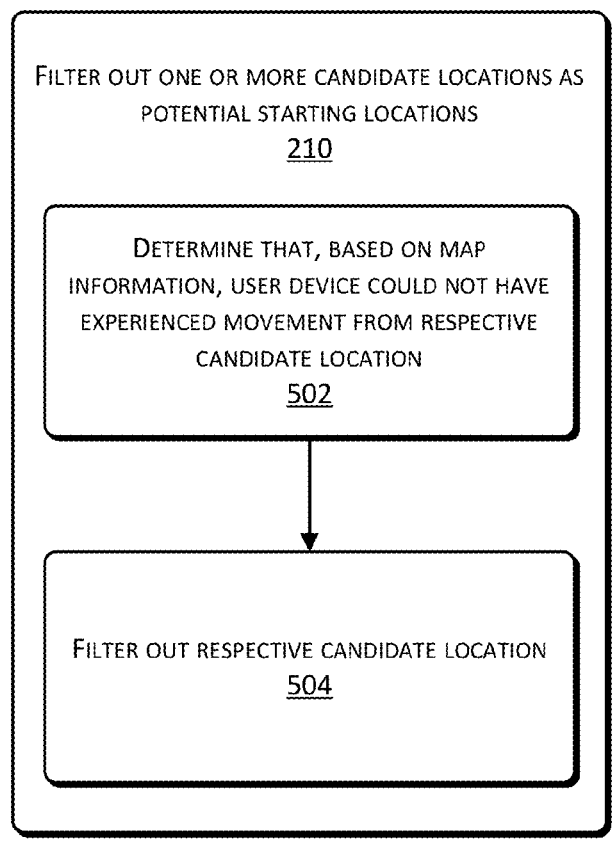
FIG. 5 is a flowchart illustrating an example method for filtering out one or more candidate locations as potential starting locations.

By reference to operation 210 in FIG. 2, FIG. 5 illustrates a flowchart of an example method for filtering out one or more candidate locations 112 as the potential starting locations.

At 502, for each of the plurality of candidate locations, the computing system determines that, based on the map information of the surrounding area 106, whether the user device 104 could have experienced the movement 116 from the respective candidate location. For example, the computing system uses one or more sensors of the user device 104 to collect moving data of the user device 104 during a period of time and calculates the movement 116 of the user device 104. The movement 116 includes, for example, a direction, a distance, and/or a moving track of the user device 104 during the movement. The computing system monitors a later position of the user device 104 from the respective candidate location 114 along the movement 116, i.e. along the same direction and distance of the movement 116.

At 504, if the computing system determines that the later position of the user device 104 from the respective candidate location is at one of the impossible locations 108, the computing system may filter out the respective candidate location as a potential starting location of the user device 104 at the first time. One or more candidate locations can be filtered at different times during the movement 116. As shown in FIG. 1, the candidate location 114(1) after experiencing the movement 116 would cross the impossible location 116 (1) and thus is filtered out. After the candidate location 110(1) is filtered out, the candidate location 110(2) after experiencing the movement 116 will cross another impossible location 108(2) and thus is also filtered out.

Figure 6:
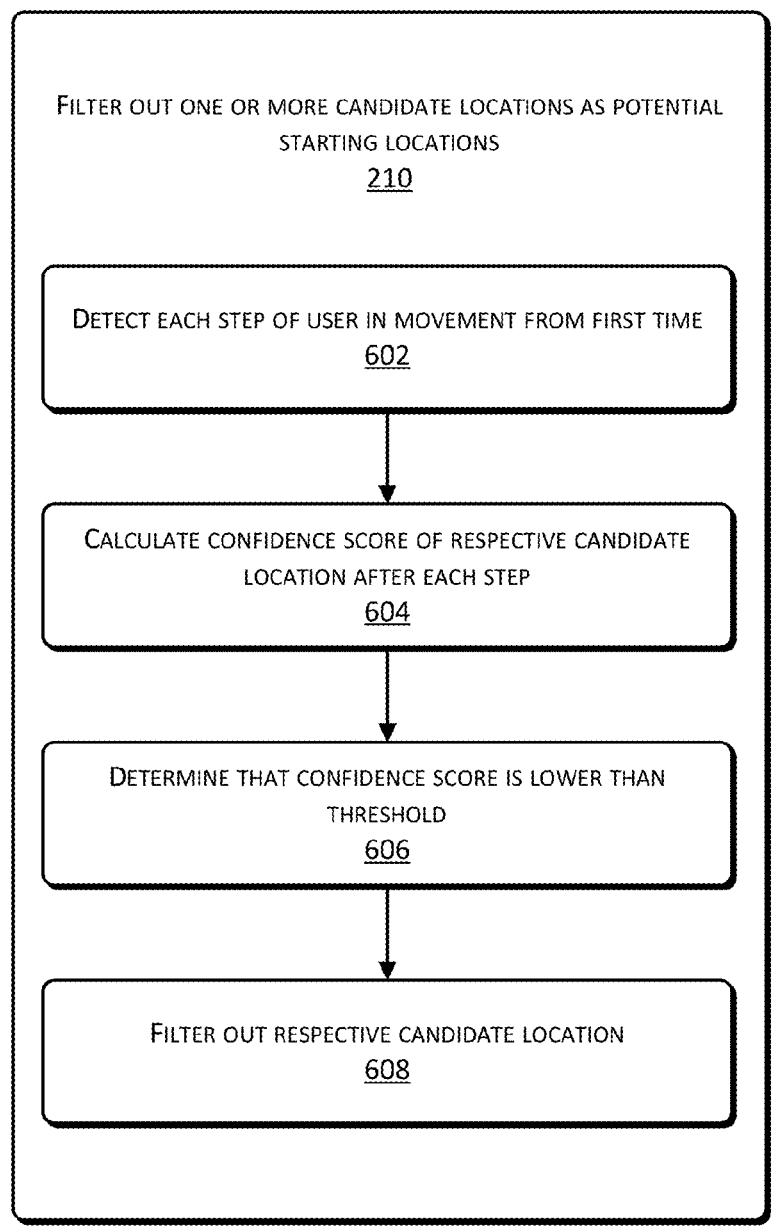
FIG. 6 is a flowchart illustrating another example method for filtering out one or more candidate locations as potential starting locations.

By reference to operation at 210 in FIG. 2, FIG. 6 illustrates a flowchart of another example method for filtering out one or more candidate locations 112 as the potential starting locations.

At 602, the computing system uses the one or more sensors of the user device 104 to detect each step of the user along the movement 116. At 604, the computing system calculates a confidence score of each of the plurality of candidate locations after each step. The confidence score measures a probability that a respective candidate location, such as the candidate location 114($p$) would end or cross at one of the impossible locations 108.

At 606, the computing system determines whether the confidence score for each candidate location is lower than a preset threshold. At 608, if the confidence score for the respective candidate location is lower than the preset threshold, the respective candidate location is filtered out as a potential starting location. If the confidence score for the respective candidate location is higher than the preset threshold, the respective candidate location is not filtered out and remains as a potential starting location.

Figure 7:
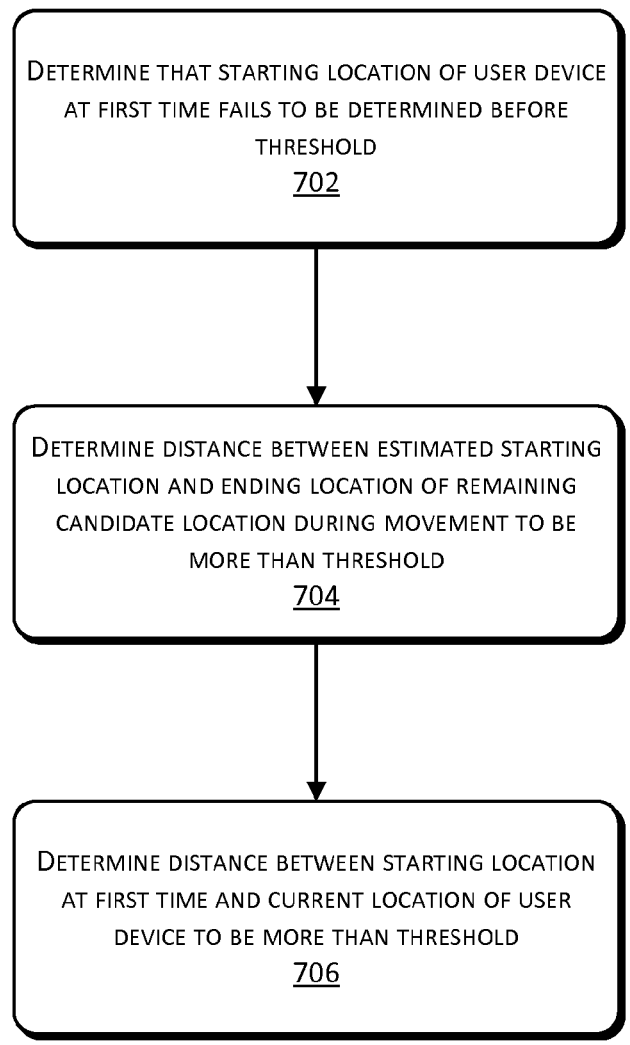
FIG. 7 is a flowchart illustrating an example method for determining whether to re-initializing determining a starting location of the user device.

By reference to operations at 216 in FIG. 2, FIG. 7 lists a few examples of the re-initialization conditions. The computing system may determine whether at least one re-initialization condition has been met.

For example, at 702, the computing system may determine that the starting location of the user device 104 at the first time fails to be determined before a preset threshold. Such threshold may be a threshold of time, or a threshold of distance of the movement 116. It may be that all candidate locations 114 are filtered out before the threshold, which may be due to loss of signals, inaccuracy of step counting, or step length evaluation. Alternatively, it may be that there are still more than one remaining candidate locations after the threshold of time or distance has passed. Thus, the computing system could not filer out all but one remaining candidate location as the starting location.

At 704, the computing system may determine that a distance between the estimated starting location and any of the remaining candidate locations is more than a threshold of distance.

At 706, after the starting location of the user device 104 at the first time is determined, the computing system may determine whether a distance between the starting location of the user device 104 at the first time and a current location of the user device 104 is more than a threshold of distance.

The threshold of distance at 702, 704, or 706 may be same or different. For example, the threshold of distance may be related to an accuracy of the signal localization technique. For example, as the accuracy of WiFi® located position is mostly within 10 meters, the threshold of distance in either of 702, 704, or 706 may be set as 10 meters.

The computing system may conduct determinations of any of the re-initialization conditions parallelly or sequentially. The sequence order at FIG. 7 is just an example.

Figure 8:
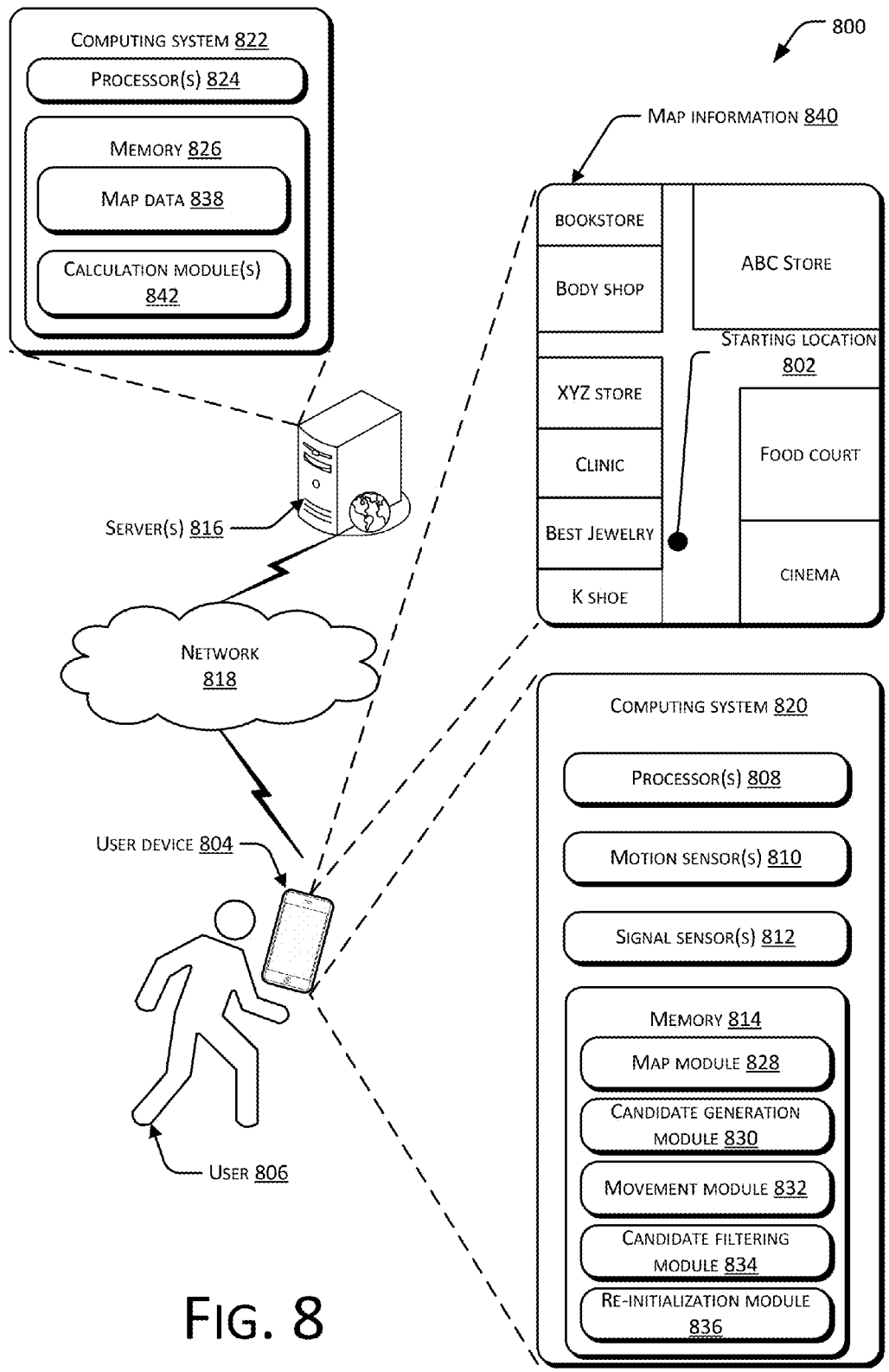
FIG. 8 illustrates an example environment for a computing system to determine the starting location of the user device.

FIG. 8 illustrates an example environment 800 for determining a starting location 802 of a user device 804. In the example of FIG. 8, a user 806 carries the user device 804. The user device 804 may be implemented as any of a variety of computing devices including, for example, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof.

The user device 804 may include one or more processor(s) 808, one or more motion sensor(s) 810, one or more signal sensor(s) 812, and memory 814. The one or more motion sensor(s) may include, for example, an accelerometer, a pedometer, a gyroscope, a compass, etc. The one or more signal sensor(s) 812 may include one or more signal sensors that send and/or receive signals such as wireless signals from adjacent signal sources. Such signals may include, for example, infrared communication, radio-frequency (RF), Bluetooth®, WiFi®, ZigBee®, infrared data association (IrDA), high-frequency modulated visible light, modulated audio signals, and/or a combination of any two or more such signals thereof. For instance, the one or more signal sensor(s) 812 may be a WiFi® network interface card.

Memory 814 may include volatile memory, non-volatile memory, removable memory, non-removable memory, and/or a combination of any of the foregoing. Generally, memory 814 contains computer executable instructions that are accessible to and executable by the one or more processors 808. The memory 814 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The user device 804 may communicate with one or more server(s) 816 through a network 818. For example, the network 818 may be a wireless network, such as the Internet.

A computing system to determine the starting location 802 of the user device 804 may include a computing system 820 residing on the user device 804, a computing system 822 residing on the server(s) 816, or a combination of the computing system 820 residing on the user device 804 and the computing system 822 residing on the server(s) 816. The one or more server(s) 816 may also include one or more process(s) 824 and memory 826.

In the example of FIG. 8, part of the computing system, i.e., the computing system 822 resides on the server(s) 816 and part of the computing system, i.e., the computing system 820, resides on the user device 804. In some other examples, the computing system may fully reside at the user device 804 or the server(s) 816.

In the example of FIG. 8, the computing system 824 uses the motion sensor(s) 810 to collect sensor data of the user device 804 and the one or more signal sensor(s) 812 to collect signal(s) received by the user device 804. In one example, the computing system 820 may sample the sensor data and signals, such as WiFi® signals received by the user device 804. For instance, the sampling rate of the motion sensor(s) 810 may be set to be 100 times/sec and the WiFi® scanning frequency may be set to be 1 time/sec. For instance, the sensor data and the calculated WiFi® located positions may be set in two separated files and use two timers (10 ms and 100 ms) to read them individually to keep the sync of two data streams. The user device 804 may perform the calculation functionalities. Alternatively, the user device 804 may transmit a portion or all of the collected sensor data and signals to the server 816 and the calculation functionalities may be performed all by the server 816 or apportioned between the user device 804 and the server 816. The server 816 may return a calculation result based on the received sensor data and signals to the user device 804.

In one example, the sensor data and WiFi® located positions has timestamp according to same clock source. The two files may be read according to their timestamp. (For instance, the sensor data file may be read first and the 1 ms timer is used to trigger processing.) The WiFi® scanning frequency may be adaptive accordingly. The confidence score of a current location result is calculated to determine whether the current location result is at an impossible location. For instance, if the current location is at the impossible location for the user device 804 to stay or a moving pattern between the estimated starting location and the current location is impossible for a human, the current location is determined as the impossible location. If the confidence score of the current location result is less than a threshold, the computing system may re-determine the current location of the user device.

Any number of program modules, applications, or components can be stored in the memory 814 and/or the memory 822. In the example of FIG. 8, the program modules stored in the memory 814 may include a map module 828, a candidate generation module 830, a candidate filtering module 832, and a re-initialization determination module 834.

The map module 828 requests and receives map data 838 stored at the memory 826 of the server(s) 816 and may present map information 840 of the surrounding area at a display of the user device 804 where the user device 804 locates based on the map data 834. The map module 828 may also determine the impossible locations, where the user device 804 or the user 806 could not stay, at the surrounding area based on the map data 834.

The candidate generation module 830 calculates the estimated starting location of the user device 804 based on the received signals from the signal sensor(s) 812, determines the estimated area within which the starting location of the user device 804 is located at the first time, and identifies a plurality of candidate locations within the estimated area.

The movement module 832 determines the movement of the user device 804 including but not limited to the direction and the moving distance of the user device 804 along the movement based on the moving data collected by the one or more sensor(s) 810.

The candidate filtering module 834 filters out one or more candidate locations as potential starting locations if the user device 104 could not have experienced the determined movement relative to such candidate location(s), and determines one remaining candidate location as the starting location of the user device 804 at the first time if there is only one remaining candidate location that has not been filtered out.

The re-initialization module 836 determines whether one or more re-initialization conditions have been met such that the computing system 824 needs to stop determining the starting location of the user device 804 at the first time, record a second time when at least one of the re-initialization condition has been met, and start to determine the starting location of the user device 804 at the second time.

The user device 804 may transmit a portion of all of the calculation tasks at the various modules at the user device 804 to one or more calculation module(s) 842 at the server(s) 816 and receive a calculation or determination result from the calculation module(s) 838 at the server(s) 816

CONCLUSION

Although the disclosure has been described in language specific to structural features and/or methodological acts, it is to be understood that the disclosure is not necessarily limited to the specific features or acts described. Rather, the specific features and acts are disclosed as exemplary forms of implementing the disclosure.

What is claimed is:

1. A method comprising:
under control of one or more processors configured with computer-executable instructions:
estimating, by the one or more processors, an area within which a starting location of a user device is located at a first time;
identifying, by the one or more processors, a plurality of candidate locations within the estimated area, each candidate location representing a potential starting location of the user device at the first time;
receiving, by the one or more processors, map information of a surrounding area of the user device, the surrounding area including the estimated area;
determining, by the one or more processors, a movement of the user device starting from the first time; and
filtering out one or more of the plurality of candidate locations as potential starting locations of the user device in response to determining that the movement of the user device from the one or more of the plurality of candidate locations would result in one or more corresponding locations that are inaccessible to the user device based on the map information.

2. The method as recited in claim 1, wherein the estimating the area comprises:
receiving by the user device one or more signals sent by one or more signal sources at the first time; and
calculating an estimated starting location of the user device at the first time at least partly based on the one or more received signals, the estimated area being based on the estimated starting location.

3. The method as recited in claim 2, wherein the estimated starting location is a central point of the estimated area.

4. The method as recited in claim 2, wherein the calculating the estimated starting location comprises:
calculating a starting signal location of the user device based on the one or more received signals;
determining whether the calculated starting signal location is at an unlikely a location that has insufficient space for the user device according to the map information;
if the calculated starting signal location of the user device is not at the location that has insufficient space, using the calculated starting signal location as the estimated starting location; and
if the calculated starting signal location of the user device is at the location that has insufficient space, identifying a location that is adjacent to the calculated starting signal location as the estimated starting location.

5. The method as recited in claim 4, wherein the location that has insufficient space includes:
a first location that has no space for the user device or the user according to the map information; or
a second location that a moving pattern between the estimated starting location and the second location is inaccessible by a human.

6. The method as recited in claim 4, wherein the calculating the starting signal location comprising using at least one of the following models: a fingerprint model or a radio propagation model.

7. The method as recited in claim 4, wherein the identifying the plurality of candidate locations within the estimated area comprises:
identifying the estimated starting location as a one of the plurality of candidate locations; and
randomly selecting multiple other candidate locations within the estimated area.

8. The method as recited in claim 7, further comprising excluding one or more of the plurality of candidate locations that are at one or more locations that have no space for the user device to stay.

9. The method as recited in claim 1, wherein the determining the movement of the user device comprises:
collecting by the user device sensor data relating to the movement of the user device; and
calculating the movement of the user device based on the received sensor data.

10. The method as recited in claim 1, wherein the determining that the movement of the user device from the one or more of the plurality of candidate locations would result in one or more corresponding locations that are inaccessible to the user device based on the map information comprises:
  detecting one or more steps of a user of the user device;
  after a respective step of the one or more steps of the user, calculating a confidence score of a respective candidate location of the plurality of candidate locations at least partly based on the movement of the user device and the map information, the confidence score measuring a probability that the respective candidate location would end in location that is inaccessible to the user device;
  determining whether the confidence score is higher than a score threshold; and
  if the confidence score is higher than the score threshold, filtering out the respective candidate location as the potential starting location of the user device.

11. The method as recited in claim 1, further comprising:
  determining that candidate locations of the plurality of candidate locations other than a remaining candidate location have been filtered out; and
  using the remaining candidate location as the starting location of the user device at the first time.

12. One or more computer storage devices having stored thereupon a plurality of computer-executable instructions that, when executed by one or more processors, causes the one or more processors to perform actions comprising:
  receiving signal data at a first time;
  calculating an estimated starting location of a user device of a user at the first time at least partly based on the received signal data;
  estimating an area within which a starting location of the user device of the user is located at the first time based on the estimated starting location;
  identifying a plurality of candidate locations within the estimated area, each candidate location representing a potential starting location of the user device at the first time, the plurality of candidate locations including the estimated starting location;
  receiving map information of a surrounding area of the user device, the surrounding area including the estimated area;
  determining a movement of the user device starting from the first time; and
  filtering out one or more candidate locations of the plurality of candidate locations as potential starting locations of the user device in response to determining that the movement of the user device from the one or more candidate locations of the plurality of candidate locations would result in one or more corresponding locations that are inaccessible to the user device based on the map information.

13. The one or more computer storage devices as recited in claim 12, wherein the actions further comprise:
  determining whether a re-initialization condition has been met such that a starting location of the user device at a second time needs to be determined during the movement, the re-initialization condition including:
    the starting location of the user device at the first time fails to be determined;
    a distance between the estimated starting location and an ending location of a respective unfiltered candidate location during the movement is longer than a preset threshold; or
    a distance between the estimated starting location of the user device at the first time and a current location of the user device is longer than another preset threshold;
  if the re-initialization condition has been met:
    recording the second time; and
    determining the starting location of the user device at the second time.

14. The one or more computer storage devices as recited in claim 13, wherein the determining the starting location of the user device at the second time comprises:
  receiving signal data at the second time;
  calculating an estimated starting location of the user device of the user at the second time at least partly based on the received signal data;
  estimating an area at the second time, within which the starting location of the user device of the user is located at the second time, based on the estimated starting location at the second time;
  identifying a plurality of additional candidate locations within the estimated area at the second time, each additional candidate location representing a potential starting location of the user device at the second time;
  receiving map information of a surrounding area of the user device at the second time, the surrounding area at the second time including the estimated area at the second time;
  determining a movement of the user device starting from the second time; and
  filtering out one or more of the plurality of additional candidate locations as potential starting locations of the user device at the second time at least partly based on the movement starting from the second time and the map information of the surrounding area at the second time.

15. The one or more computer storage devices as recited in claim 12, wherein the filtering out comprises:
  determining whether, based on the map information, the user device could have experienced the movement from the one or more candidate locations of the plurality of candidate locations; and
  filtering out the one or more candidate locations of the plurality of candidate locations as potential starting locations of the user device if, based on the map information, the user device could not have experienced the movement from the one or more candidate locations.

16. A system comprising:
  one or more processors;
  one or more signal sensors that receive signal data from one or more signal sources;
  one or more motion sensors that collect sensor data relating movement of a user device; and
  one or more computer storage media having stored thereupon a plurality of computer-executable instructions that, when executed by the one or more processors, cause the one or more processors to perform actions comprising:
    calculating an estimated starting location of the user device at a first time at least partly based on one or more signals received at the first time, the calculating comprising:
      estimating an area within which a starting location of the user device is located at the first time based on the estimated starting location;
      identifying a plurality of candidate locations within the estimated area, each candidate location of the plurality of candidate locations representing a potential starting location of the user device at the first time, the plurality of candidate locations including the estimated starting location;
    receiving map information of a surrounding area of the user device, the surrounding area including the estimated area;

determining a movement of the user device based on the collected sensor data starting from the first time; and filtering out one or more of the plurality of candidate locations as potential starting locations of the user device in response to determining that the movement of the user device from the one or more of the plurality of candidate locations would result in one or more corresponding locations that are inaccessible to the user device based on the map information.

17. The system as recited in claim 16, wherein the actions further comprise:

determining whether a re-initialization condition has been met such that a starting location of the user device at a second time needs to be determined during the movement, the re-initialization condition including:

the starting location of the user device at the first time fails to be determined;

a distance between the estimated starting location and an ending location of a respective unfiltered candidate location during the movement is longer than a preset threshold; or a distance between the determined starting location of the user device at the first time and a current location of the user device is longer than another preset threshold;

if at least one of the re-initialization conditions has been met:

recording a second time; and determining the starting location of the user device at the second time.

18. The system as recited in claim 16, wherein the actions further comprise synchronizing a data stream from the signal data and a data stream from the sensor data.

19. The method as recited in claim 16, wherein the identifying the plurality of candidate locations within the estimated area comprises randomly selecting multiple locations within the estimated area.

20. The method as recited in claim 16, wherein the determining the movement of the user device comprises:

collecting by the user device the sensor data relating the movement of the user device.

* * * * *